(12) United States Patent
Tajima et al.

(10) Patent No.: US 8,923,751 B2
(45) Date of Patent: Dec. 30, 2014

(54) RADIO COMMUNICATION SYSTEM

(75) Inventors: Yoshiharu Tajima, Kawasaki (JP);
Kazuhisa Obuchi, Kawasaki (JP);
Yoshinori Tanaka, Kawasaki (JP);
Yoshihiro Kawasaki, Kawasaki (JP);
Yoshiaki Ohta, Kawasaki (JP);
Masatsugu Shimizu, Kawasaki (JP);
Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/323,359

(22) Filed: Dec. 12, 2011

(65) Prior Publication Data
US 2012/0083274 A1 Apr. 5, 2012

Related U.S. Application Data

(63) Continuation of application No. PCT/JP2009/060941, filed on Jun. 16, 2009.

(51) Int. Cl.
*H04W 84/04* (2009.01)
*H04W 36/08* (2009.01)
*H04B 7/155* (2006.01)
*H04W 92/20* (2009.01)
*H04W 36/00* (2009.01)

(52) U.S. Cl.
CPC .............. *H04W 36/08* (2013.01); *H04W 92/20* (2013.01); *H04W 36/0016* (2013.01); *H04W 84/047* (2013.01); *H04B 7/155* (2013.01)
USPC .............................................. 455/7; 455/11.1

(58) Field of Classification Search
CPC .......... H04W 72/042; H04W 72/0413; H04W 84/047; H04B 7/15
USPC ..................... 455/436–444, 7, 11.1
See application file for complete search history.

(56) References Cited

U.S. PATENT DOCUMENTS

2005/0096051 A1* 5/2005 Lee et al. ...................... 455/438
2007/0086388 A1* 4/2007 Kang et al. .................... 370/331
(Continued)

FOREIGN PATENT DOCUMENTS

CN 101009926 A 8/2007
EP 1775984 4/2007
(Continued)

OTHER PUBLICATIONS

Fujitsu; "Pseudo Transmission Timing Control using Cyclic Shift for Downlink CoMP Joint Transmission"; R1-090951; Agenda Item 12.2; 3GPP TSG-RAN1 #56, Athens, Greece, Feb. 9-13, 2009; [Ref.: ISR dated Sep. 8, 2009].

(Continued)

*Primary Examiner* — Kiet Doan
*Assistant Examiner* — Dung Lam
(74) *Attorney, Agent, or Firm* — Myers Wolin, LLC

(57) ABSTRACT

A radio communication system includes a relay station, a first radio base station, second radio base stations, and a mobile station. The relay station is connected by radio to the first radio base station and communicates with the second radio base stations via the first radio base station. When the relay station communicates with the second radio base stations, the relay station requests the first radio base station to communicate with the second radio base stations for the relay station. The requested first radio base station communicates with the second radio base stations for the relay station and transmits a communication result to the relay station.

15 Claims, 19 Drawing Sheets

(56) References Cited

U.S. PATENT DOCUMENTS

| | | | |
|---|---|---|---|
| 2007/0253372 | A1 | 11/2007 | Nakayasu |
| 2008/0056172 | A1* | 3/2008 | Nakatsugawa ............... 370/315 |
| 2008/0108326 | A1* | 5/2008 | Park et al. .................... 455/411 |
| 2009/0156214 | A1 | 6/2009 | Lee et al. |
| 2009/0196254 | A1* | 8/2009 | Cha et al. ..................... 370/331 |
| 2009/0318155 | A1 | 12/2009 | Fukuzawa et al. |
| 2010/0093354 | A1 | 4/2010 | Agashe et al. |

FOREIGN PATENT DOCUMENTS

| | | |
|---|---|---|
| EP | 1816794 | 8/2007 |
| EP | 1 855 502 | 11/2007 |
| JP | 11-154918 | 6/1999 |
| JP | 2007-295318 | 11/2007 |
| JP | 2008-104096 | 5/2008 |
| JP | 2008-104096 A | 5/2008 |
| JP | 2009-081513 | 4/2009 |
| KR | 10-2008-0109857 | 12/2008 |
| WO | 2007/119168 | 10/2007 |

OTHER PUBLICATIONS

3GPP TR 25.913 V7.3.0; 3rd Generation Partnership Project; Technical Specification Group Radio Access Network; Requirements for Evolved UTRA (E-UTRA) and Evolved UTRAN (E-UTRAN) (Release 7); Mar. 2006.

3GPP TS 36.300 V8.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Mar. 2009.

3GPP TS 36.423 V8.5.0; 3rd Generation Partnership Project; Technical Specification Group Radio Access Network; Evolved Universal Terrestrial Radio Access Network (E-UTRAN); X2 application protocol (X2AP) (Release 8); Mar. 2009.

3GPP TR 36.913 V8.0.1; 3rd Generation Partnership Project; Technical Specification Group Radio Access Network; Requirements for further advancements for Evolved Universal Terrestrial Radio Access (E-UTRA) (LTE-Advanced) (Release 8); Mar. 2009.

International Search Report issued for corresponding International Patent Application No. PCT/JP2009/060941, mailed Sep. 8, 2009; English translation attached.

Extended European search report issued for corresponding European Patent Application No. 12152702.2 dated Jun. 22, 2012.

Official Office communication issued by the United States Patent and Trademark Office for corresponding U.S. Appl. No. 13/324,604 mailed electronically on Jul. 3, 2012.

Extended European search report with the search opinion issued for corresponding European Patent Application No. 12152710.5 dated Jun. 18, 2012.

Office Action issued for corresponding Australian Patent Application No. 2009348180, issued on Jul. 3, 2013.

Notice of Preliminary Rejection issued for corresponding Korean Patent Application No. 10-2011-7029529, mailed on May 21, 2013, with full English translation.

Final Office Action issued by the United States Patent and Trademark Office for corresponding U.S. Appl. No. 13/342,604, mailed Dec. 19, 2012.

Office Action issued for corresponding European Patent Application No. 12152702.2, dated Feb. 18, 2013.

Non-Final Office Action issued by the United States Patent and Trademark Office for corresponding U.S. Appl. No. 13/324,604, mailed Jul. 16, 2014.

Non-Final Office Action corresponding to U.S. Appl. No. 13/324,604, mailed Dec. 20, 2013.

First Notification of Office Action issued for corresponding Chinese Patent Application No. 200980159797.7 dated Aug. 26, 2014, with an English translation.

* cited by examiner

RADIO COMMUNICATION SYSTEM

This application is a continuation of International Application PCT/JP2009/060941, filed on Jun. 16, 2009, now pending, the contents of which are herein wholly incorporated by reference.

FIELD

The embodiments discussed herein are related to a radio communication system such as a mobile telecommunication system.

BACKGROUND

A cellular communication system has become the mainstream of mobile telecommunication systems such as mobile phone systems. With the cellular communication system a plurality of areas (cells) in each of which a base station can perform transmission and receiving are combined to perform communication in a wide area. When a mobile station moves, a base station is switched to continue communication.

At present third generation mobile telecommunication services based on a CDMA (Code Division Multiple Access) system have been begun. A next generation mobile telecommunication system which enables higher-speed communication is widely discussed.

In 3GPP (3rd Generation Partnership Project), on the other hand, LTE (Long Term Evolution) and a high-speed radio service referred to as LTE-advanced which is a further developed version of LTE are discussed. With LTE-advanced the introduction of a relay station is discussed as a technique for enhancing throughput or improving characteristics in a dead spot.

To make it impossible for a mobile station to recognize the presence of a relay station is possible. In 3GPP, however, to make a relay station operate in the same way as an ordinary radio base station operates is mainly discussed. In this case, an upper base station to the relay station functions from the relay station as a mere connection point like a router.

A technique for reducing the number of times a mobile station performs transmission in a radio communication system in which a relay station is located by reducing the amount of signaling is proposed as a prior art (Japanese Laid-open Patent Publication No. 2009-81513 (Paragraphs [0035]-[0047], FIGS. 1 and 2)).

With LTE or LTE-advanced base stations may communicate with each other for hand-over or interference control. A communication interface between base stations is prescribed as an X2 interface.

FIG. 17 illustrates interfaces among base stations. A radio network 5a includes base stations eNB0 through eNB4. With the X2 interface in LTE base stations are connected by wire. In the case of FIG. 17, the base station eNB0 is connected to the base stations eNB1 through eNB4 via wired transmission lines X2-1 through X2-4 respectively.

For the sake of simplicity only interfaces between the base stations eNB0 and eNB1, between the base stations eNB0 and eNB2, between the base stations eNB0 and eNB3, and between the base stations eNB0 and eNB4 are illustrated. In reality, however, each base station is connected to another base station. As a result, mesh-like connections are made.

When the base station eNB0 communicates with another base station, the base station eNB0 uses wire in accordance with the X2 interface. For example, when the base station eNB0 communicates with the base station eNB1, the base station eNB0 uses the wired transmission line X2-1. When the base station eNB0 communicates with the base station eNB2, the base station eNB0 uses the wired transmission line X2-2.

Usually communication between base stations based on the X2 interface is performed in this way by wire. However, if the above relay station which operates in the same way as a base station operates is included, the relay station and an upper base station are connected by radio. As a result, a radio connection is made in a part of an interval based on the X2 interface.

FIG. 18 illustrates interfaces among base stations in a radio network including a relay station. A radio network 5b includes base stations eNB0 through eNB4, a relay station RN, and a mobile station UE.

The relay station RN operates in the same way as an ordinary base station operates. In addition, there is an upper base station (base station eNB0), which is also referred to as a donor, to the relay station RN. The relay station RN is connected to the upper base station eNB0 via a radio transmission line X2-5. The mobile station UE is under the control of the relay station RN.

The relay station RN communicates with the base stations eNB1 through eNB4 via the upper base station eNB0. Accordingly, not only wired communication but also radio communication is performed. For example, when the relay station RN communicates with the base station eNB1, the radio transmission line X2-5 and a wired transmission line X2-1 are used.

FIG. 19 is a sequence diagram of hand-over. Hand-over is indicated as an example of communication between the relay station RN and another base station. It is assumed that the mobile station UE under the control of the relay station RN in the radio network 5b performs hand-over and that candidate hand-over destinations are the base stations eNB1 and eNB2.

(S101) When the mobile station UE performs hand-over, the mobile station UE measures receiving levels of radio waves transmitted from surrounding base stations as a result of the movement, adds measurement results to signaling referred to as a measurement report, and transmits the signaling to the relay station RN.

(S102) When the relay station RN receives the receiving level measurement results, the relay station RN recognizes that the receiving levels of radio waves transmitted from the base stations eNB1 and eNB2 are high and that the base stations eNB1 and eNB2 are candidate hand-over destinations. It is assumed that the relay station RN first transmits an HO request (hand-over request signaling) to the base station eNB1. The HO request is transmitted to the base station eNB1 via the upper base station eNB0.

(S103) When the base station eNB1 receives the HO request, the base station eNB1 determines from its congestion state and the like whether or not hand-over to the base station eNB1 is possible. If hand-over to the base station eNB1 is possible, then the base station eNB1 returns an HO OK (hand-over enable signaling). If hand-over to the base station eNB1 is impossible, then the base station eNB1 returns an HO fail (hand-over disable signaling). In this case, the base station eNB1 determines that hand-over to the base station eNB1 is impossible, and returns an HO fail to the relay station RN. The HO fail is transmitted to the relay station RN via the upper base station eNB0.

(S104) When the relay station RN receives the HO fail from the base station eNB1, the relay station RN transmits an HO request to the base station eNB2 which is the other candidate hand-over destination. The HO request is transmitted to the base station eNB2 via the upper base station eNB0.

(S105) When the base station eNB2 receives the HO request, the base station eNB2 determines whether or not hand-over to the base station eNB2 is possible. If hand-over to the base station eNB2 is possible, then the base station eNB2 returns an HO OK to the relay station RN. The HO OK is transmitted to the relay station RN via the upper base station eNB0.

(S106) The relay station RN determines from the contents of the HO OK that the base station eNB2 is a hand-over destination, and gives the mobile station UE notice to that effect by an HO command (hand-over command). The mobile station UE then recognizes from the contents of the HO command that the base station eNB2 is a hand-over destination base station, and performs hand-over to the base station eNB2.

When the relay station RN communicates with another base station, radio communication is performed via the radio transmission line X2-5 between the relay station RN and the upper base station eNB0. However, if interference from another station, interference with another station, and the like are taken into consideration, it is desirable that the amount of radio signaling on the radio transmission line X2-5 should be reduced. That is to say, it is desirable that the amount of radio signaling exchanged between the relay station RN and the upper base station eNB0 or the number of times radio signaling is exchanged between the relay station RN and the upper base station eNB0 should be small.

In the above hand-over sequence, however, hand-over is performed without taking the amount of radio signaling into consideration. Accordingly, radio signaling is frequently exchanged between the relay station RN and the upper base station eNB0 before a hand-over destination base station is determined.

As a result, the amount of radio signaling on the radio transmission line X2-5 increases, the level of interference from another station or interference with another station rises, and communication quality deteriorates. In addition, with radio communication there is a long delay in a process such as establishment of a radio line. Accordingly, if radio communication is performed frequently, processing delay increases.

In the above description hand-over is taken as an example. However, the same problem may occur in communication other than hand-over between the relay station RN and another base station.

SUMMARY

According to an aspect of the present invention, a radio communication system includes: a first radio base station, a second radio base station, and a relay station which is connected by radio to the first radio base station and which communicates with the second radio base station via the first radio base station, wherein the relay station requests the first radio base station to communicate with the second radio base station for the relay station, and the requested first radio base station communicates with the second radio base station for the relay station and transmits a communication result to the relay station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
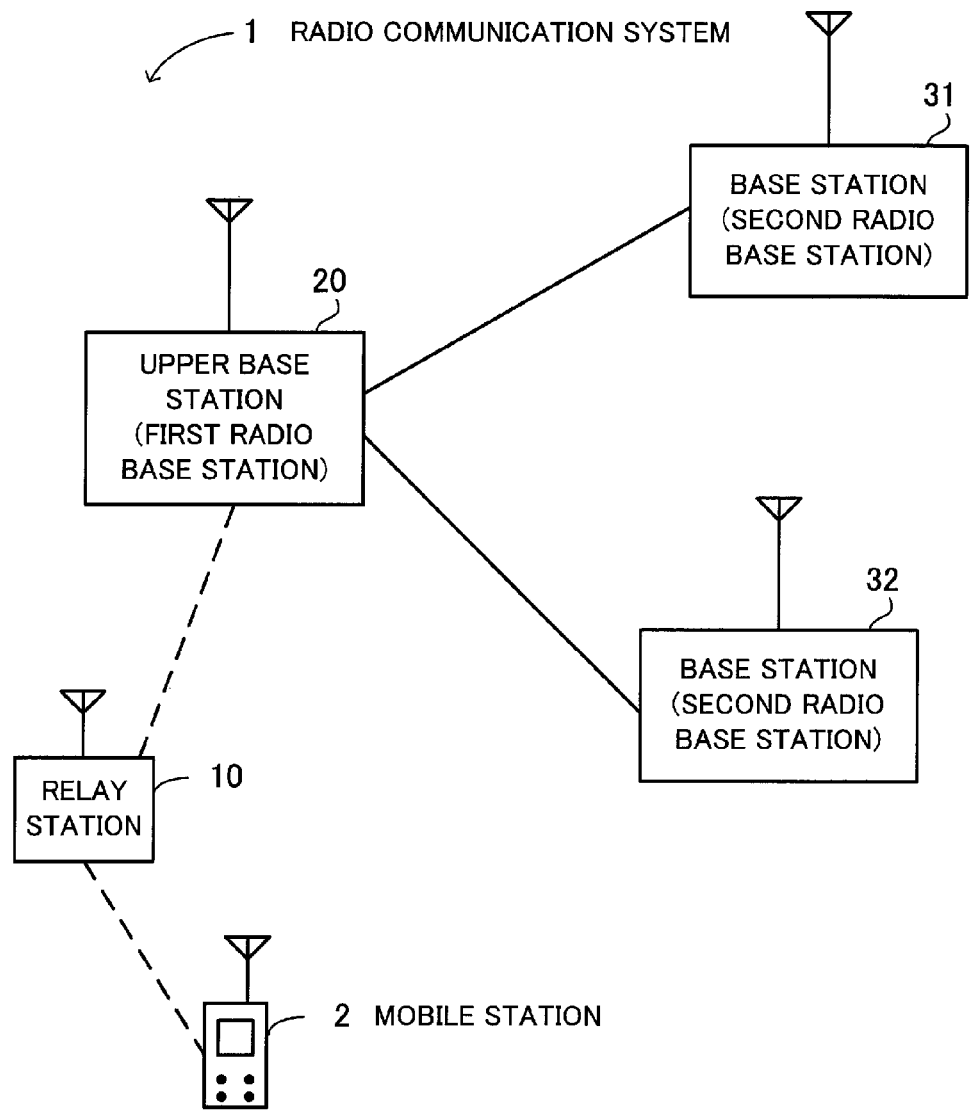
FIG. 1 illustrates an example of the structure of a radio communication system.

Embodiments will now be described with reference to the drawings. FIG. 1 illustrates an example of the structure of a radio communication system. A radio communication system 1 includes a relay station 10, an upper base station (first radio base station) 20, base stations (second radio base stations) 31 and 32, and a mobile station 2. The base stations 31 and 32 are connected to the upper base station 20 by wire. The relay station 10 is connected to the upper base station 20 by radio and communicates with the base stations 31 and 32 via the upper base station 20.

When the relay station 10 communicates with the base station 31 or 32, the relay station 10 requests the upper base station 20 to communicate with the base station 31 or 32 for the relay station 10. The upper base station 20 requested to communicate with the base station 31 or 32 for the relay station 10 communicates with the base station 31 or 32 for the relay station 10 and transmits a communication result to the relay station 10. In order to communicate with the base station 31 or 32, the relay station 10 may request the upper base station 20 to perform communication with the base station 31 or 32 for the relay station 10 or may perform ordinary communication with the base station 31 or 32 without requesting the upper base station 20 to perform communication with the base station 31 or 32 for the relay station 10.

Figure 2:
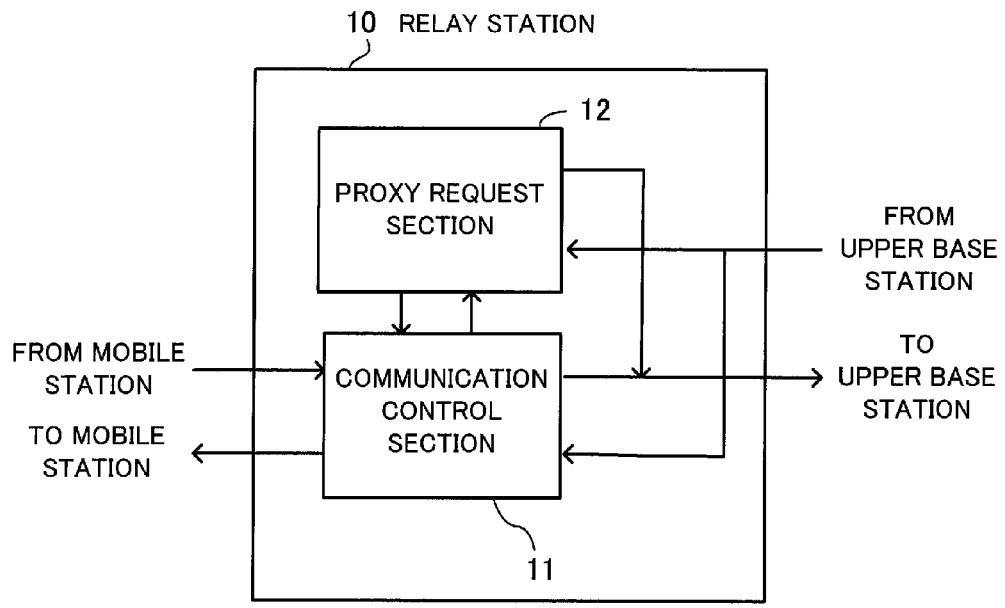
FIG. 2 illustrates an example of the structure of a relay station.

The structure and operation of the relay station 10 and the upper base station 20 included in the radio communication system 1 will now be described in detail. FIG. 2 illustrates an example of the structure of the relay station. FIG. 2 indicates a function regarding control information processing. Functions such as data transmission and receiving will be omitted.

The relay station 10 includes a communication control section 11 and a proxy request section 12. When the communication control section 11 receives control information transmitted from the mobile station 2, the communication control section 11 determines whether or not the control information is for making a proxy request to the upper base station 20. If the control information is for making a proxy request to the upper base station 20, then the communication control section 11 transmits the control information to the proxy request section 12. If the control information is not for making a proxy request to the upper base station 20, then the communication control section 11 exercises determined communication control and transmits a result to the mobile station 2 or the upper base station 20. In addition, when the communication control section 11 receives control information transmitted from the proxy request section 12 or the upper base station 20, the communication control section 11 exercises determined communication control and transmits a result to the mobile station 2.

When the proxy request section 12 receives the control information for making a proxy request to the upper base station 20, the proxy request section 12 generates a proxy request including the contents of the control information, and transmits the proxy request to the upper base station 20. In addition, when the proxy request section 12 receives a proxy response which is information regarding a response to a proxy request and which is transmitted from the upper base station 20, the proxy request section 12 transmits the proxy response to the communication control section 11.

Figure 3:
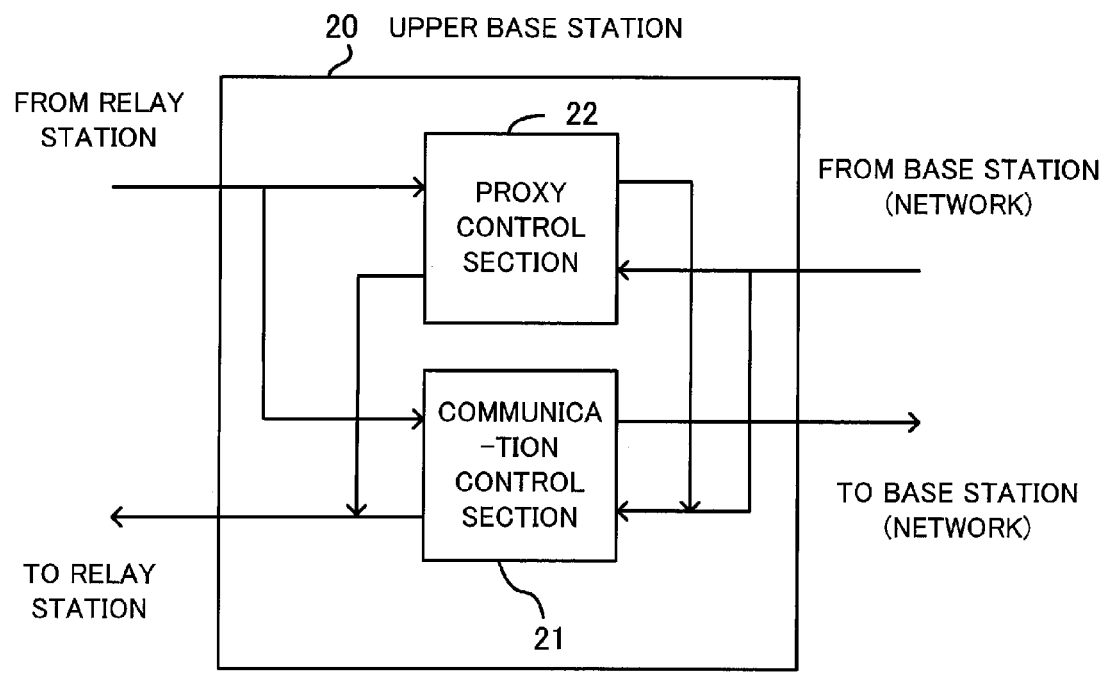
FIG. 3 illustrates an example of the structure of an upper base station.

FIG. 3 illustrates an example of the structure of the upper base station 20. FIG. 3 indicates a function regarding control information processing. Functions such as data transmission and receiving will be omitted. The upper base station 20 includes a communication control section 21 and a proxy control section 22.

Control information which is transmitted from the relay station 10 and which is a proxy request is transmitted to the proxy control section 22. Control information which is transmitted from the relay station 10 and which is not a proxy request is transmitted to the communication control section 21. The communication control section 21 exercises determined communication control for the control information which is not a proxy request, and transmits a result to the mobile station 2 or another base station. In addition, when the communication control section 21 receives control information transmitted from another base station (network including the base station 31, 32, or the like), the communication control section 21 exercises determined communication control and transmits a result to the relay station 10.

When the proxy control section 22 receives the proxy request transmitted from the relay station 10, the proxy control section 22 performs a proxy process with another base station and transmits a result transmitted from it to the relay station 10 as a proxy response.

Figure 4:
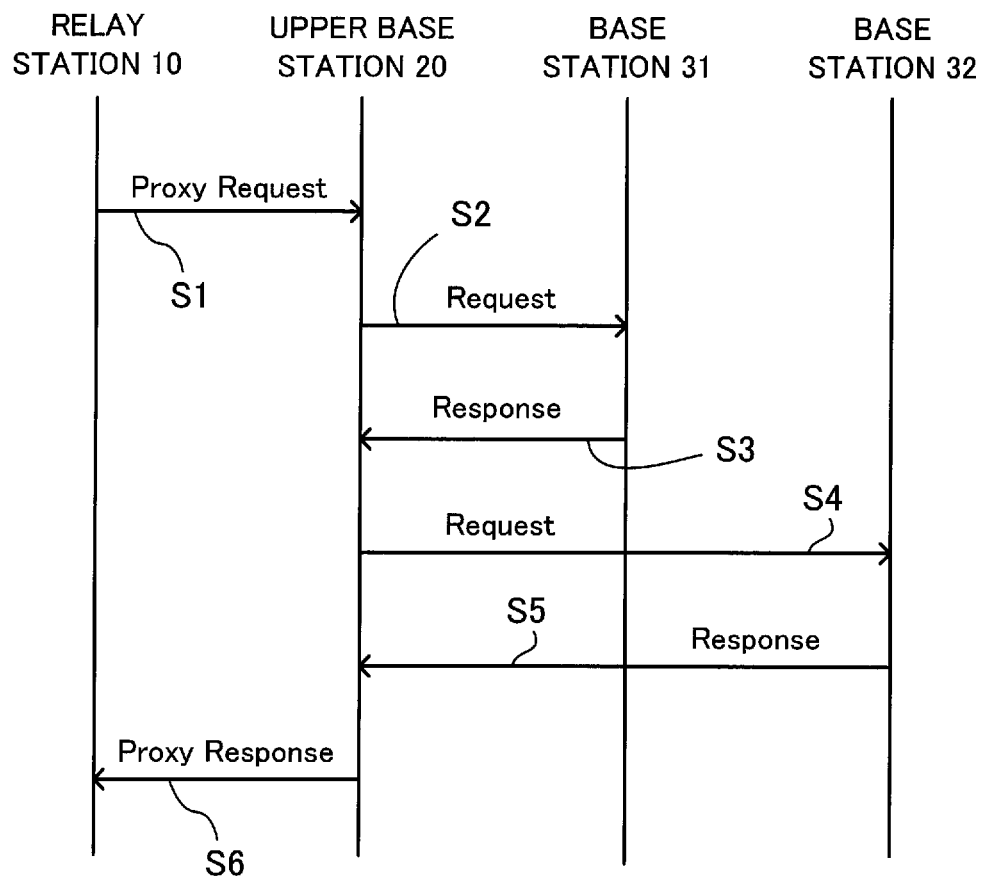
FIG. 4 is a sequence diagram of communication.

FIG. 4 is a sequence diagram of communication. When the relay station 10 communicates with the base stations 31 and 32, the relay station 10 requests the upper base station 20 to perform communication processes for the relay station 10, and the upper base station 20 transmits results obtained by performing the communication processes for the relay station 10 to the relay station 10.

(S1) When the relay station 10 communicates with the base stations 31 and 32, the relay station 10 transmits a proxy request (proxy request signaling) to the upper base station 20. By doing so, the relay station 10 requests the upper base station 20 to perform communication with the base stations 31 and 32 for the relay station 10.

(S2) When the upper base station 20 receives the proxy request, the upper base station 20 recognizes from the contents of the proxy request that the upper base station 20 communicates with the base stations 31 and 32. First the upper base station 20 transmits a request (request signaling) to the base station 31.

(S3) When the base station 31 receives the request, the base station 31 performs a determined process and informs the upper base station 20 about a result by a response (response signaling).

(S4) The upper base station 20 transmits a request to the base station 32.

(S5) When the base station 32 receives the request, the base station 32 performs a determined process and informs the upper base station 20 about a result by a response.

(S6) When the upper base station 20 receives the responses transmitted from the base stations 31 and 32, the upper base station 20 adds the contents of the responses to a proxy response (proxy response signaling) and transmits the proxy response to the relay station 10.

As has been described, when the relay station 10 communicates with the base stations 31 and 32, the relay station 10 requests the upper base station 20 to perform communication processes for the relay station 10. The upper base station 20 communicates with the base stations 31 and 32 for the relay station 10 and transmits the results of the communication processes to the relay station 10. As a result, the amount of radio communication between the relay station 10 and the upper base station 20 can be reduced.

The case where in the radio communication system 1 the relay station 10 requests the upper base station 20 to perform a communication process for the relay station 10 will now be described with concrete communication control as an example. First control exercised in the case where the relay station 10 requests the upper base station 20 at the time of hand-over by the mobile station 2 under the control of the relay station 10 to select a hand-over destination base station will be described.

Figure 5:
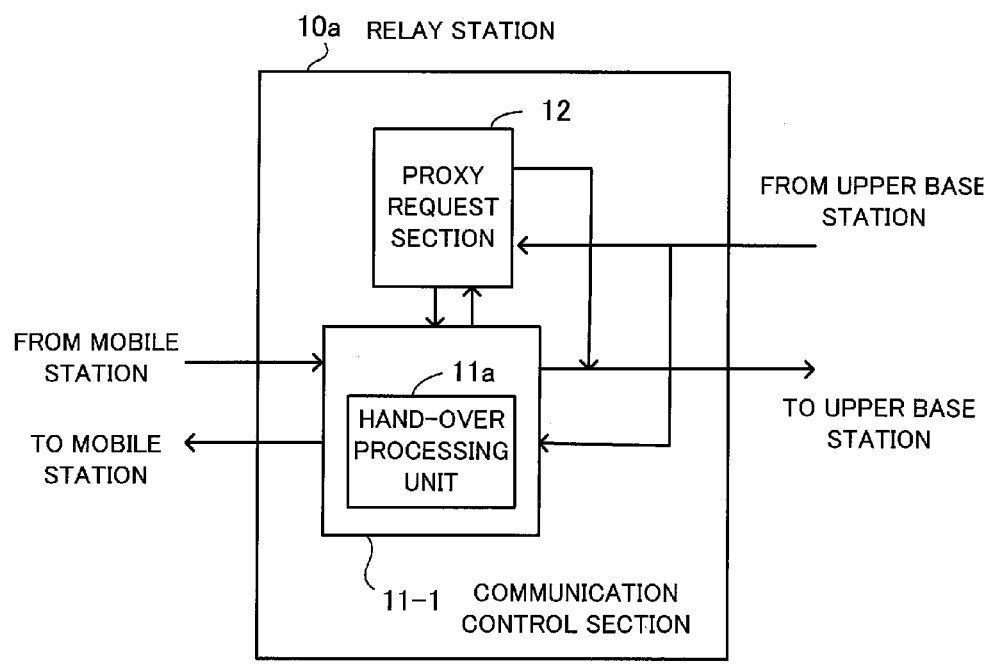
FIG. 5 illustrates an example of the structure of a relay station.

FIG. 5 illustrates an example of the structure of a relay station. The structure of an upper base station 20 is the same as that of the upper base station 20 illustrated in FIG. 3. A relay station 10*a* includes a communication control section 11-1 and a proxy request section 12. The communication control section 11-1 includes a hand-over processing unit 11*a*.

When the communication control section 11-1 receives a measurement report transmitted from a mobile station 2, the communication control section 11-1 recognizes that the mobile station 2 performs hand-over. In addition to ID of the mobile station 2, setting information for the mobile station 2, and the like, the hand-over processing unit 11*a* passes receiving level measurement information included in the measurement report (information which the mobile station 2 obtains by measuring receiving levels of radio waves transmitted from surrounding base stations) to the proxy request section 12. The proxy request section 12 generates a proxy request for requesting the upper base station 20 to perform a hand-over process for the relay station 10*a*, and transmits the proxy request to the upper base station 20.

On the other hand, the upper base station 20 having the same structure as that of the upper base station 20 illustrated in FIG. 3 determines whether control information transmitted from the relay station 10*a* is ordinary information or a proxy request. If the control information transmitted from the relay station 10*a* is a proxy request, then the proxy request is transmitted to a proxy control section 22. If the control information transmitted from the relay station 10*a* is not a proxy request, then the control information is transmitted to a communication control section 21. When the proxy control section 22 receives a proxy request, the proxy control section 22 selects a hand-over destination for the relay station 10*a* and transmits information regarding the selected hand-over destination to the relay station 10*a* as a proxy response.

Figure 6:
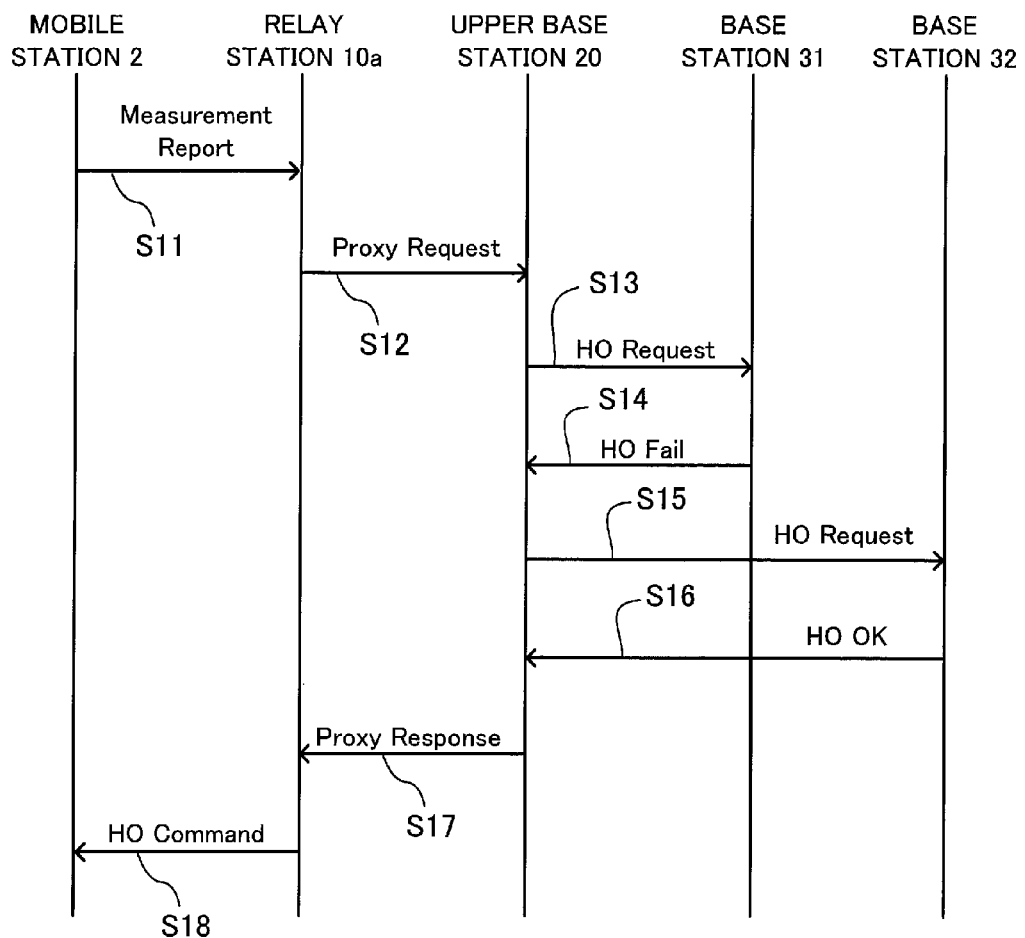
FIG. 6 is a sequence diagram of communication.

FIG. 6 is a sequence diagram of communication. When the mobile station 2 under the control of the relay station 10a performs hand-over, the relay station 10a requests the upper base station 20 to select a hand-over destination base station.

(S11) When the mobile station 2 performs hand-over, the mobile station 2 transmits a measurement report to the relay station 10a.

(S12) When the relay station 10a receives the measurement report, the relay station 10a recognizes that the mobile station 2 is to perform hand-over. The relay station 10a generates a proxy request and transmits the proxy request to the upper base station 20. By doing so, the relay station 10a requests the upper base station 20 to perform a hand-over process for the relay station 10a.

The proxy request includes state information for the mobile station 2. Information (context), such as mobile station ID and a transmission rate, regarding the state of the mobile station 2, receiving level measurement information included in the measurement report transmitted from the mobile station 2, and the like correspond to the state information.

(S13) When the upper base station 20 receives the proxy request, the upper base station 20 recognizes that the receiving levels of radio waves transmitted from base stations 31 and 32 are high and that the base stations 31 and 32 are candidate hand-over destinations. It is assumed that the upper base station 20 first transmits an HO request to the base station 31.

(S14) When the base station 31 receives the HO request, it is assumed that the base station 31 determines from its congestion state and the like that hand-over to the base station 31 is impossible. In this case, the base station 31 returns an HO fail.

(S15) When the upper base station 20 receives the HO fail from the base station 31, the upper base station 20 transmits an HO request to the base station 32 which is the other candidate hand-over destination.

(S16) When the base station 32 receives the HO request, it is assumed that the base station 32 determines that hand-over to the base station 32 is possible. In this case, the base station 32 returns an HO OK to the upper base station 20.

(S17) The upper base station 20 determines from the contents of the HO OK that the base station 32 is a hand-over destination, and informs the relay station 10a about this result by a proxy response.

(S18) When the relay station 10a receives the proxy response, the relay station 10a recognizes that a hand-over destination base station is the base station 32, and gives the mobile station 2 notice to that effect by an HO command.

Figure 19:
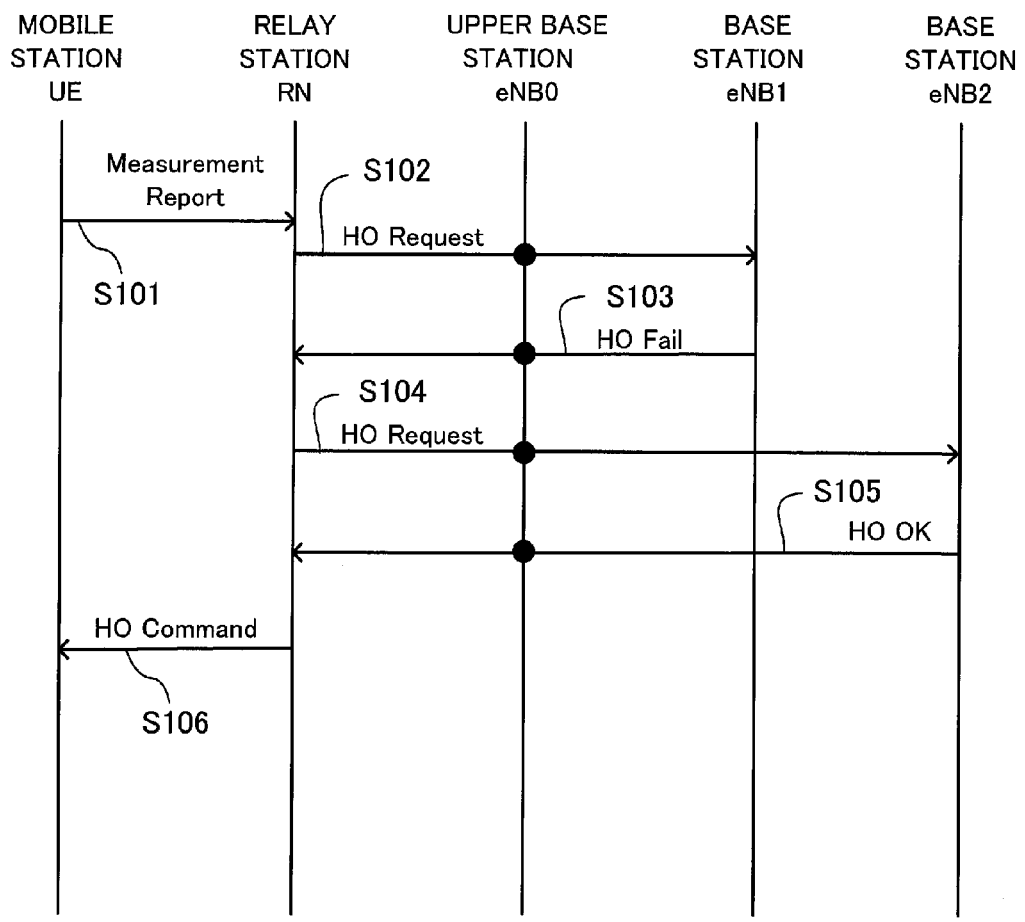
FIG. 19 is a sequence diagram of hand-over.

As indicated in FIG. 19, radio signaling has traditionally been exchanged frequently between a relay station and candidate hand-over destinations before determination of a hand-over destination base station. With the above hand-over proxy control, however, the relay station 10a requests the upper base station 20 at the time of hand-over by the mobile station 2 to select a destination base station. The relay station 10a receives a result from the upper base station 20 and informs the mobile station 2 about the result.

As a result, radio signaling exchanged between the relay station 10a and the upper base station 20 is the proxy request and the proxy response. Accordingly, the amount of radio communication between the relay station 10a and the upper base station 20 can be reduced.

If there is a possibility that the number of times radio signaling is exchanged with a candidate hand-over destination is small, such as if only receiving level measurement information for one base station is included in a measurement report transmitted from the mobile station 2, then the relay station 10a can determine that the relay station 10a does not exercise proxy control. If the relay station 10a determines that it is unnecessary to request the upper base station 20 to perform a hand-over process for the relay station 10a, then the relay station 10a may perform an ordinary hand-over process like that indicated in FIG. 19.

Control exercised in the case where state information, such as receiving level measurement information, for a mobile station 2 is transmitted in advance to a relay station and where hand-over is performed will now be described.

Figure 7:
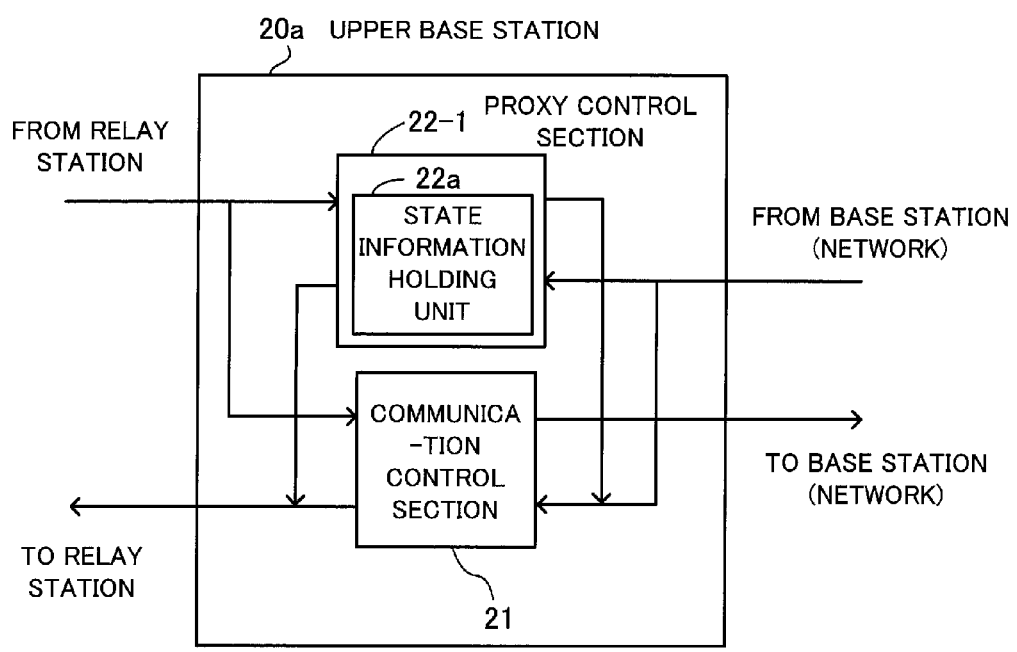
FIG. 7 illustrates an example of the structure of an upper base station.

FIG. 7 illustrates an example of the structure of an upper base station. The structure of a relay station is the same as that of the relay station 10a illustrated in FIG. 5. An upper base station 20a includes a communication control section 21 and a proxy control section 22-1. In addition, the proxy control section 22-1 includes a state information holding unit 22a.

When a relay station 10a having the same structure as that of the relay station 10a illustrated in FIG. 5 receives a measurement report from the mobile station 2, the relay station 10a extracts receiving level measurement information included in the measurement report. A proxy request section 12 adds the receiving level measurement information to a proxy request and transmits the proxy request to the upper base station 20a.

On the other hand, when the upper base station 20a receives the proxy request transmitted from the relay station 10a, the proxy control section 22-1 extracts the receiving level measurement information and holds the receiving level measurement information in the state information holding unit 22a. The proxy control section 22-1 then selects a hand-over destination for the relay station 10a on the basis of the receiving level measurement information and transmits information regarding the selected hand-over destination to the relay station 10a as a proxy response.

Figure 8:
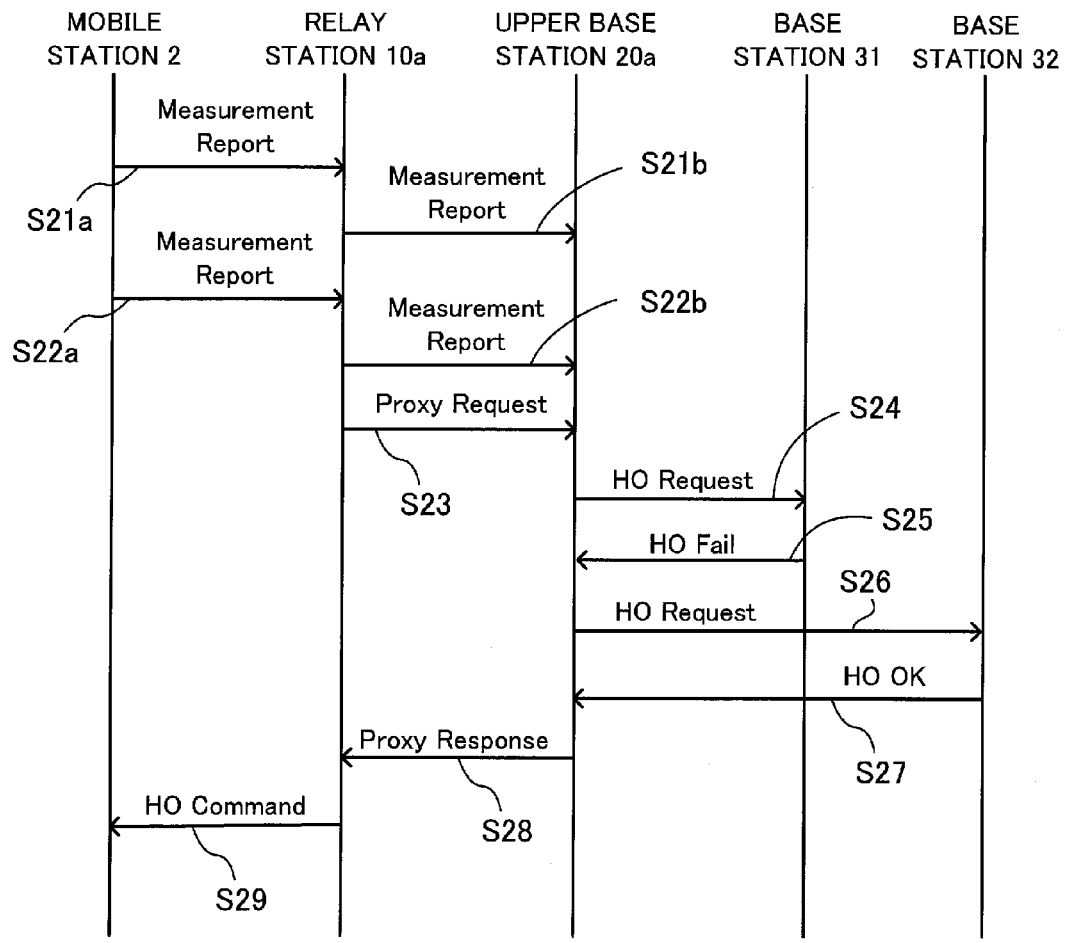
FIG. 8 is a sequence diagram of communication.

FIG. 8 is a sequence diagram of communication. Receiving level measurement information which the mobile station 2 obtains by measurement is transmitted in advance to the relay station 10a. After that, hand-over is performed.

(S21a) The mobile station 2 transmits the receiving level measurement information to the relay station 10a by a measurement report.

(S21b) When the relay station 10a receives the measurement report, the relay station 10a transmits the measurement report to the upper base station 20a. The upper base station 20a extracts and holds the receiving level measurement information included in the measurement report.

(S22a) The mobile station 2 continues to move, and measures receiving levels of radio waves transmitted from base stations at a new place to which the mobile station 2 has moved. The mobile station 2 then transmits new receiving level measurement information again to the relay station 10a by a measurement report.

(S22b) When the relay station 10a receives the measurement report, the relay station 10a transmits the measurement report to the upper base station 20a. The upper base station 20a extracts and holds the receiving level measurement information included in the measurement report and updates the receiving level measurement information.

(S23) By transmitting a proxy request to the upper base station 20a, the relay station 10a requests the upper base station 20a to perform a hand-over process for the relay station 10a. Receiving level measurement information is not included in the proxy request. Accordingly, the amount of information included in the proxy request is small compared with the amount of information included in the proxy request generated in the above step S12.

(S24) The upper base station 20a recognizes from the receiving level measurement information about which the upper base station 20a is already informed by the measurement report that the receiving levels of radio waves transmitted from base stations 31 and 32 are high and that the base stations 31 and 32 are candidate hand-over destinations. When the upper base station 20a receives the proxy request, the upper base station 20a recognizes that the mobile station 2 is to perform hand-over, and transmits an HO request to the base station 31.

(S25) When the base station 31 receives the HO request, the base station 31 determines from its congestion state and the like that hand-over to the base station 31 is impossible, and returns an HO fail.

(S26) When the upper base station 20a receives the HO fail from the base station 31, the upper base station 20a transmits an HO request to the base station 32 which is the other candidate hand-over destination.

(S27) When the base station 32 receives the HO request, the base station 32 determines that hand-over to the base station 32 is possible, and returns an HO OK to the upper base station 20a.

(S28) The upper base station 20a determines from the contents of the HO OK that the base station 32 is a hand-over destination, and informs the relay station 10a about this result by a proxy response.

(S29) When the relay station 10a receives the proxy response, the relay station 10a recognizes that a hand-over destination base station is the base station 32, and gives the mobile station 2 notice to that effect by an HO command.

As has been described, the relay station 10a informs the upper base station 20a in advance about receiving level measurement information about which the relay station 10a is informed by a measurement report transmitted from the mobile station 2 under the control of the relay station 10a. The upper base station 20a holds the receiving level measurement information.

When the mobile station 2 performs hand-over, the relay station 10a requests the upper base station 20a by a proxy request to perform hand-over for the relay station 10a. Receiving level measurement information is not included in the proxy request. Accordingly, the amount of radio communication can be reduced further. In addition, the relay station 10a can request the upper base station 20a in a short period of time to perform hand-over for the relay station 10a. As a result, a delay caused by a hand-over process can be reduced.

In the above description state information for the mobile station 2 is receiving level measurement information. The mobile station 2 informs the relay station 10a in advance about the receiving level measurement information by a measurement report. However, a measurement report may include mobile station ID, a transmission rate, and the like in addition to receiving level measurement information. Accordingly, the mobile station 2 may also inform the relay station 10a in advance about the mobile station ID, the transmission rate, and the like by this measurement report. By doing so, the amount of information included in a proxy request can be reduced further.

Control exercised in the case where candidate destinations include a relay station and where an upper base station to the relay station transmits a hand-over request for a base station will now be described.

Figure 9:
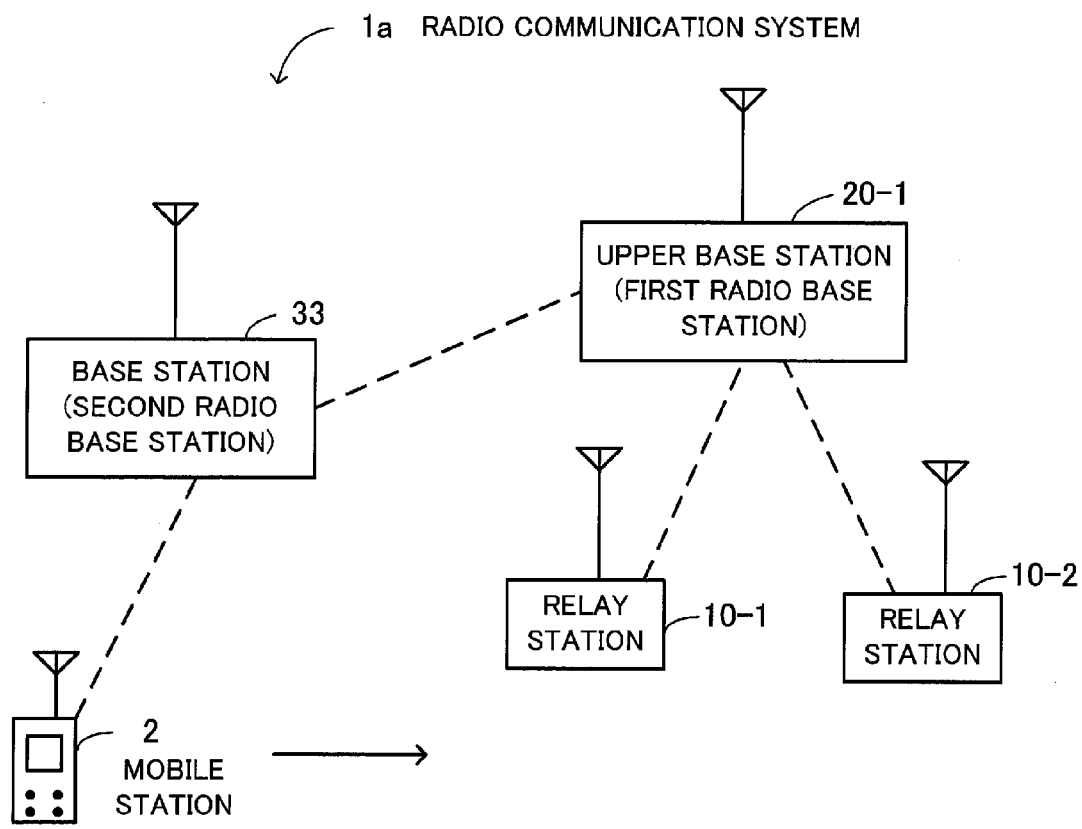
FIG. 9 illustrates an example of the structure of a radio communication system.

FIG. 9 illustrates an example of the structure of a radio communication system. A radio communication system 1a includes an upper base station (first radio base station) 20-1, a base station (second radio base station) 33, relay stations 10-1 and 10-2, and a mobile station 2. The upper base station 20-1 and the base station 33 are connected by radio. The relay stations 10-1 and 10-2 are connected to the upper base station 20-1 by radio. In addition, the mobile station 2 is under the control of the base station 33.

The radio communication system 1a has the above structure. When the base station 33 recognizes on the basis of a measurement report from the mobile station 2 that the mobile station 2 is to perform hand-over, the base station 33 selects a hand-over destination base station. It is assumed that candidate hand-over destinations are the relay stations 10-1 and 10-2. The base station 33 requests the upper base station 20-1 to the relay stations 10-1 and 10-2 to perform a hand-over process for the base station 33.

Figure 10:
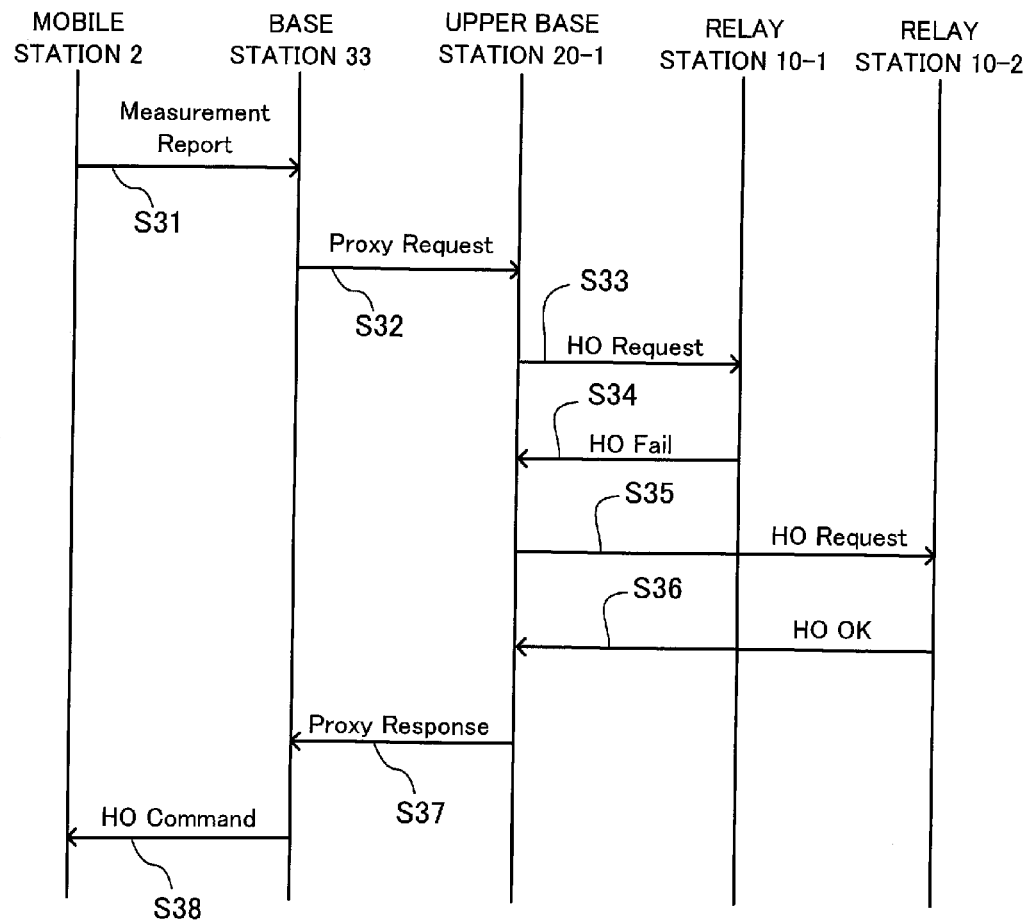
FIG. 10 is a sequence diagram of communication.

FIG. 10 is a sequence diagram of communication. If candidate destinations include the relay stations 10-1 and 10-2, the upper base station 20-1 to the relay stations 10-1 and 10-2 transmits a hand-over request for the base station 33.

(S31) When the mobile station 2 performs hand-over, the mobile station 2 transmits receiving level measurement information to the base station 33 by a measurement report.

(S32) When the base station 33 receives the measurement report, the base station 33 recognizes that the mobile station 2 is to perform hand-over. The base station 33 generates a proxy request and transmits the proxy request to the upper base station 20-1. By doing so, the base station 33 requests the upper base station 20-1 to perform a hand-over process for the base station 33.

(S33) When the upper base station 20-1 receives the proxy request, the upper base station 20-1 recognizes on the basis of the receiving level measurement information included in the proxy request that the receiving levels of radio waves transmitted from the relay stations 10-1 and 10-2 are high and that the relay stations 10-1 and 10-2 are candidate hand-over destinations. It is assumed that the upper base station 20-1 first transmits an HO request to the relay station 10-1.

(S34) When the relay station 10-1 receives the HO request, it is assumed that the relay station 10-1 determines from its congestion state and the like that hand-over to the relay station 10-1 is impossible. In this case, the relay station 10-1 returns an HO fail to the upper base station 20-1.

(S35) When the upper base station 20-1 receives the HO fail from the relay station 10-1, the upper base station 20-1 transmits an HO request to the relay station 10-2 which is the other candidate hand-over destination.

(S36) When the relay station 10-2 receives the HO request, it is assumed that the relay station 10-2 determines that hand-over to the relay station 10-2 is possible. In this case, the relay station 10-2 returns an HO OK to the upper base station 20-1.

(S37) The upper base station 20-1 determines from the contents of the HO OK that the relay station 10-2 is a hand-over destination, and informs the base station 33 about this result by a proxy response.

(S38) When the base station 33 receives the proxy response, the base station 33 recognizes that a hand-over destination base station is the relay station 10-2, and gives the mobile station 2 notice to that effect by an HO command.

By adopting the radio communication system 1a described above, the amount of radio communication between the base station 33 and the upper base station 20-1 can be reduced.

Control exercised in the case where an upper base station reports an interference amount measured by a relay station to another station for the relay station and receives a report of an interference amount from another station for a relay station will now be described. Base stations report interference conditions to one another in order to exercise interference control. As a result, a relay station also reports its interference amount to another station and receives a report of an interference amount from another station.

Accordingly, an interference amount is transmitted or received by radio via an upper base station. This is the same with hand-over. In the case of communication control on interference amount transmission and receiving, an upper base station transmits and receives an interference amount for a relay station. By doing so, the amount of radio communication between the relay station and the upper base station is reduced.

Figure 11:
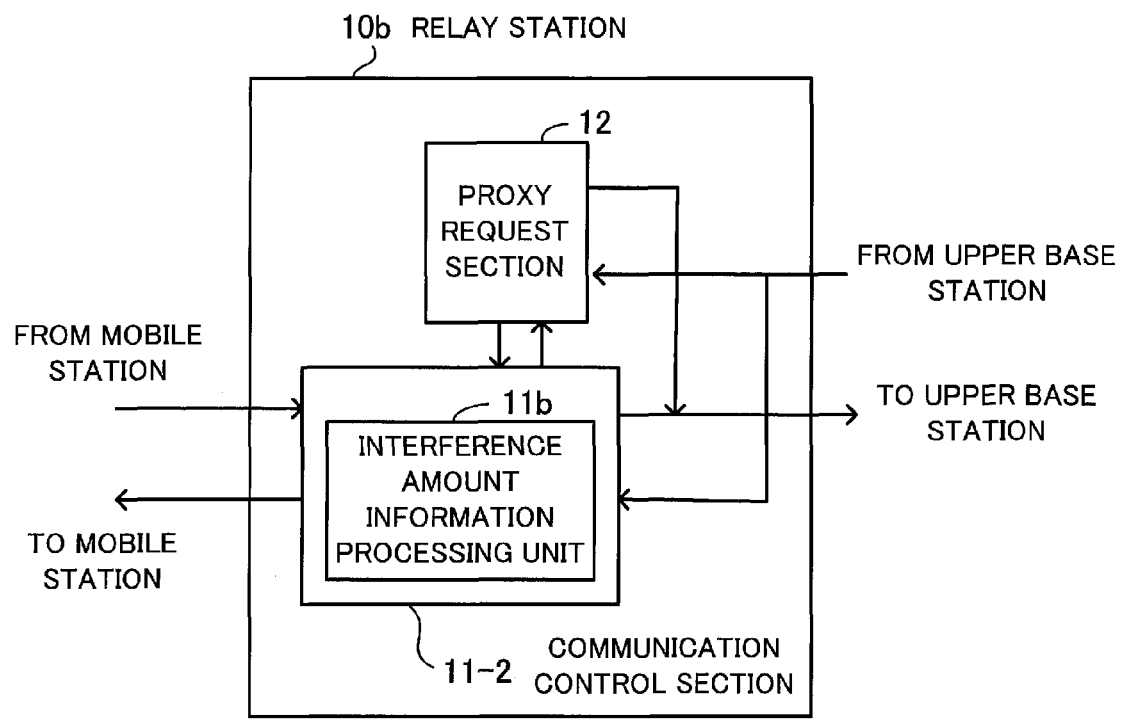
FIG. 11 illustrates an example of the structure of a relay station.
Figure 12:
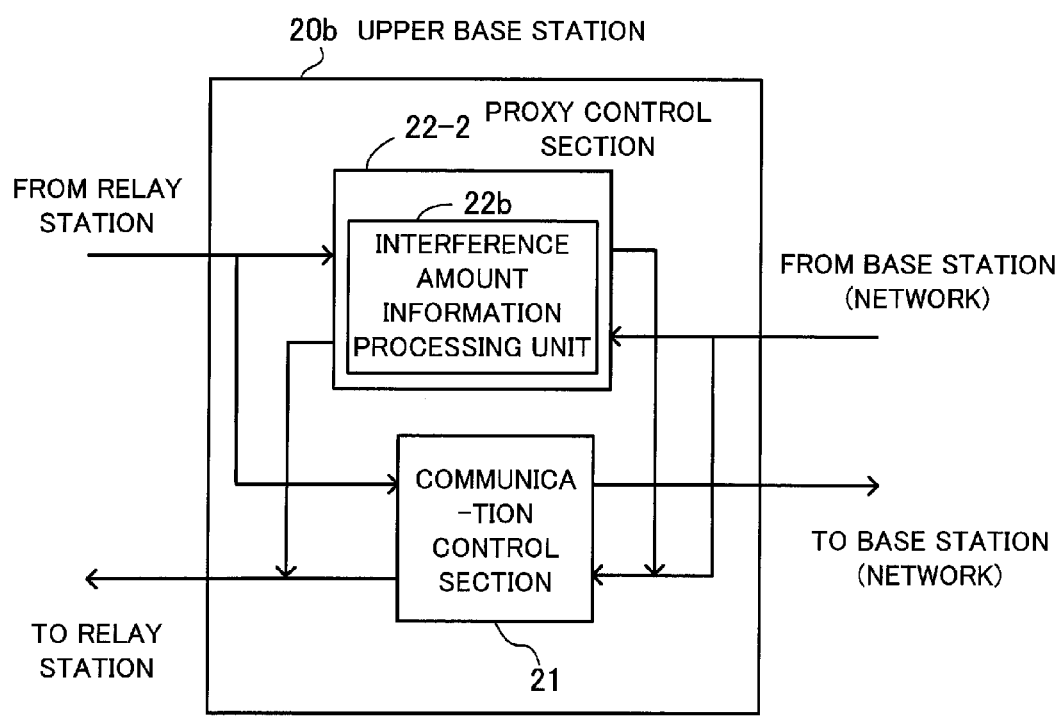
FIG. 12 illustrates an example of the structure of an upper base station.

FIG. 11 illustrates an example of the structure of a relay station. FIG. 12 illustrates an example of the structure of an upper base station. A relay station 10b includes a communication control section 11-2 and a proxy request section 12. The communication control section 11-2 includes an interference amount information processing unit 11b. The upper base station 20b includes a communication control section 21 and a proxy control section 22-2. The proxy control section 22-2 includes an interference amount information processing unit 22b.

The interference amount information processing unit 11b of the relay station 10b measures and holds an interference amount of the relay station 10b and passes interference amount information to the proxy request section 12. The proxy request section 12 adds the interference amount information to a proxy request and informs the upper base station 20b about the interference amount information. The interference amount information processing unit 22b included in the proxy control section 22-2 of the upper base station 20b informed by the relay station 10b about the interference amount information informs surrounding base stations about the interference amount information for the relay station 10b. In addition, the interference amount information processing unit 22b totalizes interference amount information transmitted from surrounding base stations and the proxy control section 22-2 transmits a totalization result to the relay station 10b.

Figure 13:
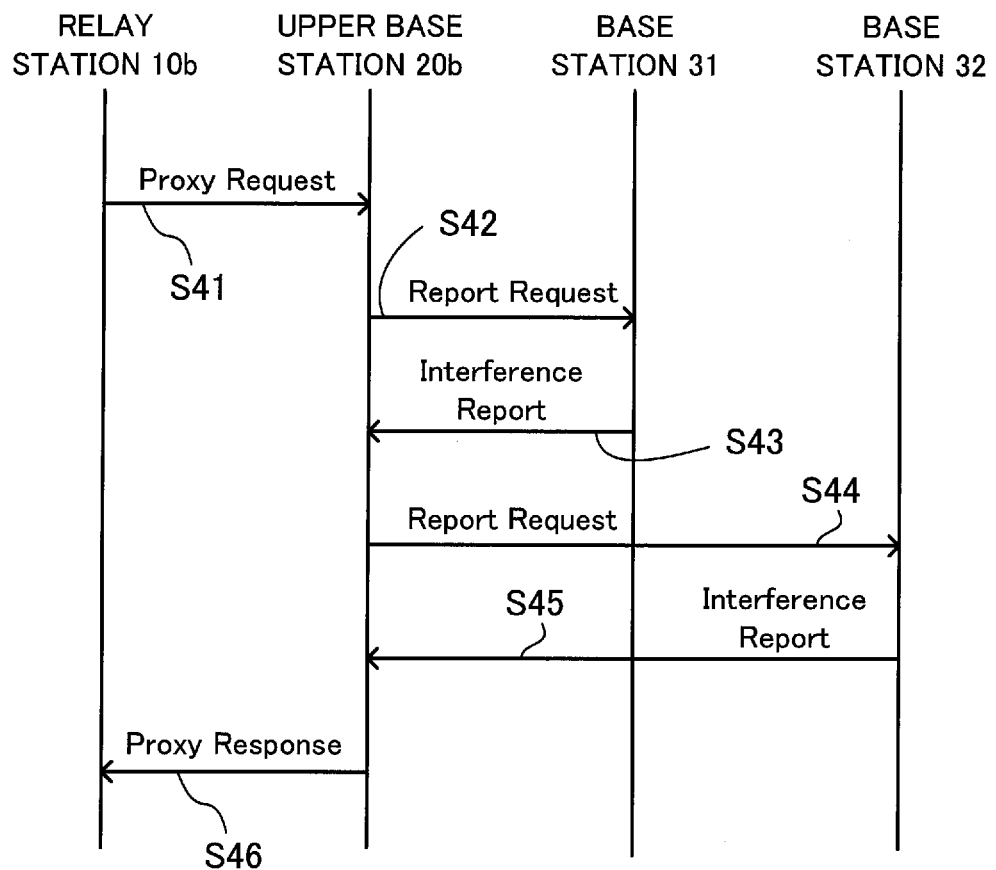
FIG. 13 is a sequence diagram of communication.

FIG. 13 is a sequence diagram of communication. The upper base station 20b reports an interference amount of the relay station 10b to another station for the relay station 10b and receives a report of an interference amount from another station for the relay station 10b.

(S41) In order to request the upper base station 20b to report interference amount information to another station for the relay station 10b and receive a report of interference amount information from another station for the relay station 10b, the relay station 10b transmits a proxy request to the upper base station 20b. The proxy request includes interference amount information (relay-station-side interference amount information) obtained by measurement by the relay station 10b.

(S42) The upper base station 20b receives the proxy request. The upper base station 20b transmits a report request to a base station 31 in order to request the base station 31 to report interference amount information (base-station-side interference amount information) obtained by measurement by the base station 31. The report request also includes the interference amount information for the relay station 10b. By doing so, the upper base station 20b informs the base station 31 about the interference amount information for the relay station 10b.

(S43) When the base station 31 receives the report request, the base station 31 adds interference amount information for the base station 31 to an interference report and returns the interference report to the upper base station 20b.

(S44) The upper base station 20b transmits a report request to a base station 32 in order to request the base station to report interference amount information obtained by measurement by the base station 32. The report request also includes the interference amount information for the relay station 10b. By doing so, the upper base station 20b informs the base station 32 about the interference amount information for the relay station 10b.

(S45) When the base station 32 receives the report request, the base station 32 adds interference amount information for the base station 32 to an interference report and returns the interference report to the upper base station 20b.

(S46) The upper base station 20b informs the relay station 10b about the interference amount information for the base stations 31 and 32 by a proxy response.

As has been described, the relay station 10b requests the upper base station 20b to report interference amount information obtained by measurement by the relay station 10b to each base station or collect interference amount information obtained by measurement by each base station. By doing so, the amount of radio communication between the relay station 10b and the upper base station 20b can be reduced.

Interference amount information may be reported if a condition set in advance is met. Alternatively, interference amount information may be reported periodically. In these cases, the upper base station 20b holds interference amount information transmitted from other base stations. When the relay station 10b requests the upper base station 20b to collect interference amount information for the relay station 10b, the upper base station 20b informs the relay station 10b about the interference amount information which the upper base station 20b holds.

Control exercised in the case where a plurality of base stations transmit data to a mobile station in cooperation and where an upper base station informs the plurality of base stations about scheduling information regarding data transmission for the plurality of base stations will now be described.

With LTE-advanced the introduction of a technique which is referred to as CoMP (Coordinated Multiple Point transmission and reception) and by which base stations transmit data to a mobile station in cooperation is discussed.

With CoMP a central base station performs scheduling for data transmission. The other base stations perform transmission in accordance with scheduling information. If the central base station is a relay station and the relay station transmits the scheduling information to each base station via an upper base station, then the amount of radio communication increases. Therefore, in order to reduce the amount of radio communication between the relay station and the upper base station, the upper base station informs each base station about the scheduling information for the relay station.

Figure 14:
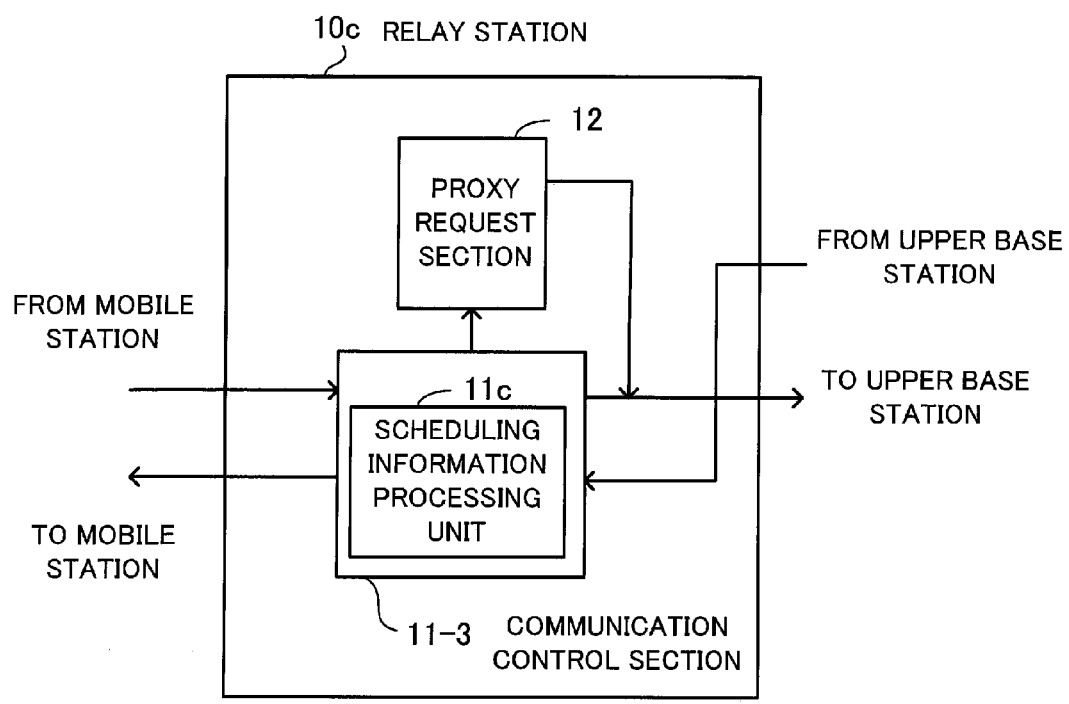
FIG. 14 illustrates an example of the structure of a relay station.
Figure 15:
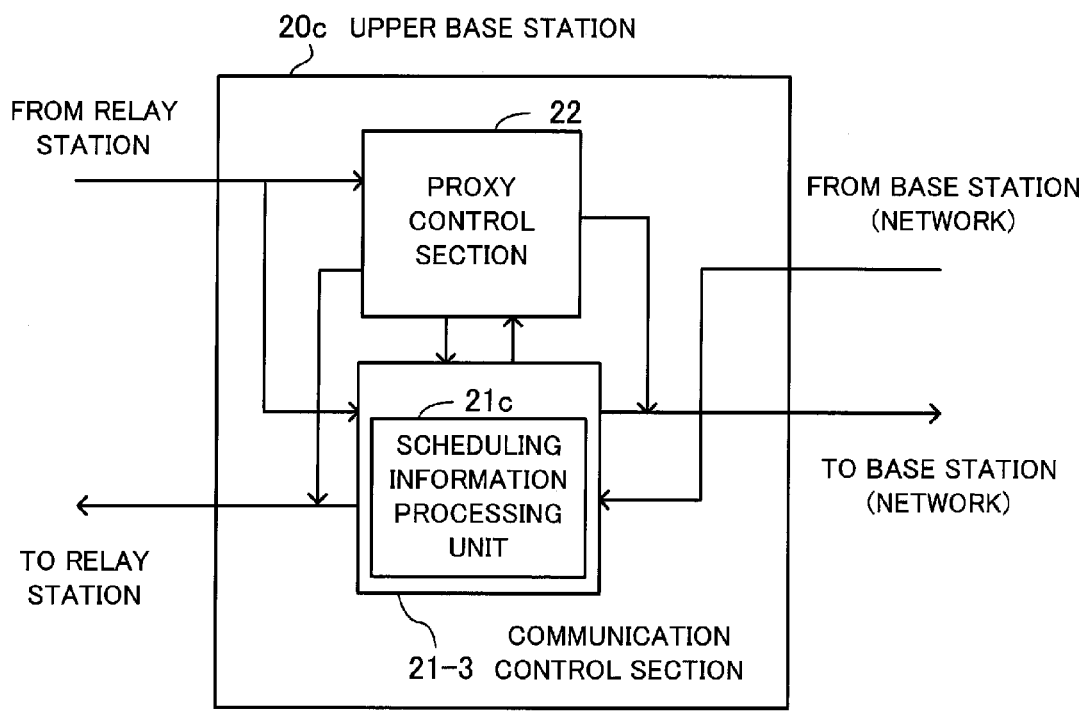
FIG. 15 illustrates an example of the structure of an upper base station.

FIG. 14 illustrates an example of the structure of a relay station. FIG. 15 illustrates an example of the structure of an upper base station. A relay station 10c includes a communication control section 11-3 and a proxy request section 12. The communication control section 11-3 includes a scheduling information processing unit 11c. An upper base station 20c includes a communication control section 21-3 and a proxy control section 22. The communication control section 21-3 includes a scheduling information processing unit 21c.

The scheduling information processing unit 11c of the relay station 10c performs scheduling and passes scheduling information to the proxy request section 12. The proxy request section 12 adds the scheduling information to a proxy request and informs the upper base station 20c about the proxy request.

The proxy control section 22 of the upper base station 20c receives the proxy request, extracts the scheduling information from the proxy request, and transmits the scheduling information to the scheduling information processing unit 21c included in the communication control section 21-3. In addition, the proxy control section 22 transmits the scheduling information to base stations 31 and 32. The scheduling information processing unit 21c included in the communication control section 21-3 sets the scheduling information in the upper base station 20c.

Figure 16:
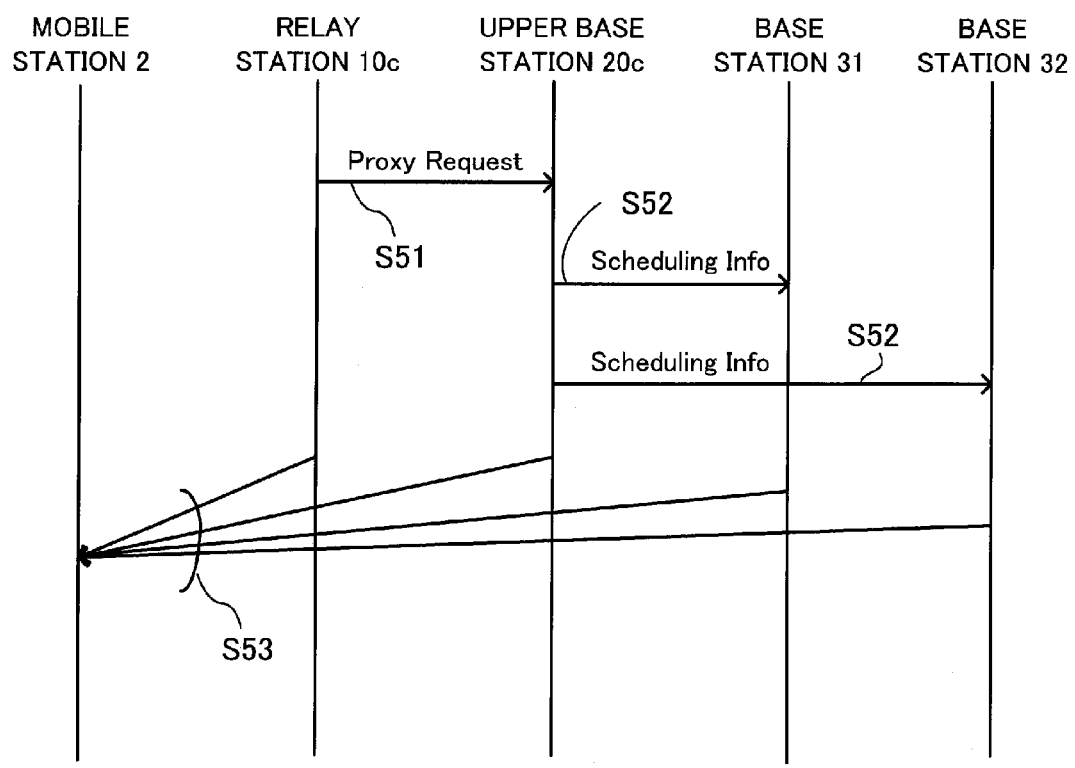
FIG. 16 is a sequence diagram of communication.
Figure 17:
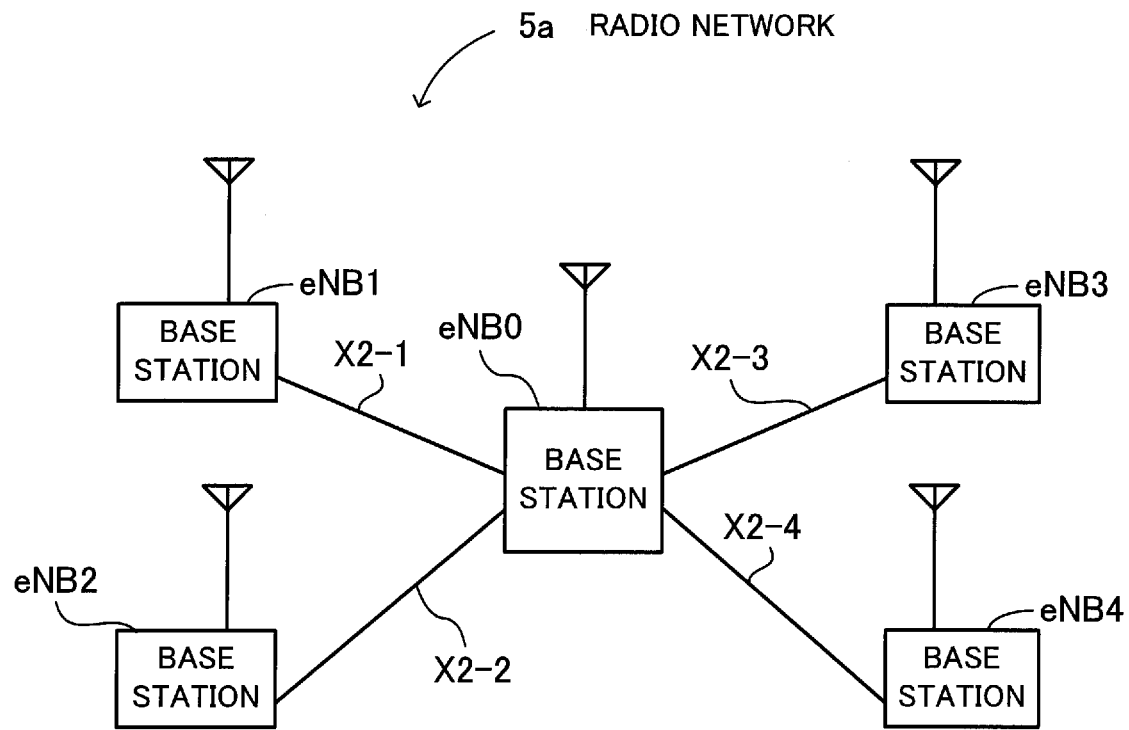
FIG. 17 illustrates interfaces among base stations.
Figure 18:
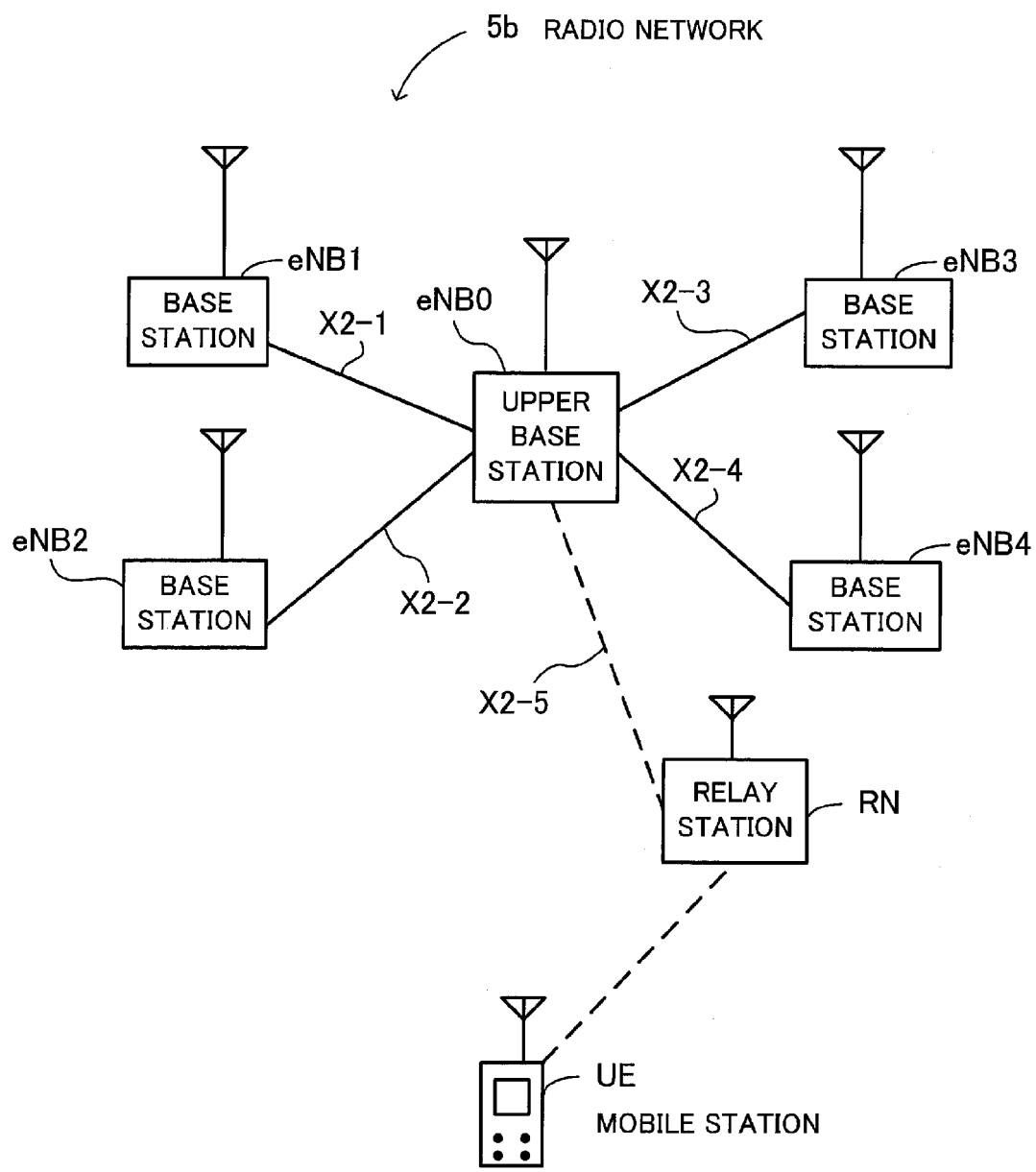
FIG. 18 illustrates interfaces among base stations in a radio network including a relay station.

FIG. 16 is a sequence diagram of communication. The relay station 10c performs CoMP on a mobile station 2 under the control of the relay station 10c.

(S51) The relay station 10c performs scheduling for transmitting data to the mobile station 2 by CoMP, and generates scheduling information including data transmission timing. The relay station 10c then requests the upper base station 20c by a proxy request to inform the base stations 31 and 32 about the scheduling information for the relay station 10c. The proxy request includes the scheduling information.

(S52) When the upper base station 20c receives the proxy request, the upper base station 20c extracts the scheduling information and informs the base stations 31 and 32 about the scheduling information.

(S53) In accordance with the scheduling information the relay station 10c, the upper base station 20c, and the base stations 31 and 32 transmit data to the mobile station 2.

As has been described, when data is transmitted to the mobile station 2 by CoMP, the upper base station 20c informs base stations about scheduling information regarding data transmission for the relay station 10c. By doing so, the amount of radio communication between the relay station 10c and the upper base station 20c can be reduced.

As has been described in the foregoing, with the radio communication system 1 the relay station 10 requests the upper base station 20 to communicate with the base stations 31 and 32 for the relay station 10 and the requested upper base station 20 communicates with the base stations 31 and 32 for the relay station 10. The upper base station 20 transmits a communication result to the relay station 10.

As a result, the amount of radio communication between the relay station 10 and the upper base station 20 is reduced. This enables a reduction in interference from or with another station or a reduction in processing delay. Accordingly, communication quality can be improved.

Communication quality can be improved by reducing the amount of radio communication between a relay station and a base station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A radio communication system comprising:
    a proxy radio base station;
    a plurality of radio base stations connected to the proxy radio base station by wires;
    a relay station which is connected by radio to the proxy radio base station and which communicates with the plurality of radio base stations via the proxy radio base station; and
    a mobile station which is within a radio communication area of the relay station and generates receiving level information by measuring receiving levels of radio waves transmitted from surrounding base stations;
  wherein:
    the relay station requests the proxy radio base station to communicate with the plurality of radio base stations on behalf of the relay station when the relay station recognizes that the number of times radio signaling at the mobile station is larger than a predetermined value based on the receiving level information transmitted from the mobile station; and
    the requested proxy radio base station communicates with the plurality of radio base stations on behalf of the relay station via wired transmission interfaces and transmits a plurality of communication results from the respective plurality of radio base stations to the relay station via a radio transmission interface;
  and wherein:
    the relay station communicates with the plurality of radio base stations directly when the relay station recognizes that the number of times radio signaling at the mobile station is smaller than the predetermined value based on the receiving level information.

2. The radio communication system according to claim 1, wherein:
    at the time of hand-over by a mobile station under control of the relay station;
    the relay station requests the proxy radio base station to select a hand-over destination base station from among the plurality of radio base stations, and
    the requested proxy radio base station selects the hand-over destination base station and informs the relay station about a selection result.

3. The radio communication system according to claim 2, wherein:
    the relay station informs the proxy radio base station in advance about state information for the mobile station; and
    when the proxy radio base station is requested to select the hand-over destination base station, the proxy radio base station selects the hand-over destination base station by the use of the state information about which the proxy radio base station is already informed.

4. The radio communication system according to claim 1, wherein when the relay station reports relay-station-side interference amount information which is an interference amount measured by the relay station to the plurality of radio base stations or receives base-station-side interference amount information which is an interference amount measured by the plurality of radio base stations, the relay station requests the proxy radio base station to report the relay-station-side interference amount information to the plurality of radio base stations or collect the base-station-side interference amount information, and the requested proxy radio base station reports the relay-station-side interference amount information to the plurality of radio base stations or collects the base-station-side interference amount information from the plurality of radio base stations and informs the relay station about collection results.

5. The radio communication system according to claim 1, wherein:
    the relay station which performs scheduling for data transmission at the time of surrounding radio base stations transmitting data in cooperation to a mobile station performs the scheduling, generates scheduling information, and requests the proxy radio base station to inform the plurality of radio base stations about the scheduling information; and the requested proxy radio base station informs the plurality of radio base stations about the scheduling information.

6. A relay station which is connected by radio to a proxy radio base station and which communicates with a plurality of radio base stations connected to the proxy radio base station by wires via the proxy radio base station and which communicates with a mobile station, the relay station comprising:
a communication control section which exercises communication control;
a proxy request section which requests the proxy radio base station to communicate with the plurality of radio base stations on behalf of the relay station via wired transmission interfaces in the case of recognizing that the number of times radio signaling at the mobile station is larger than a predetermined value based on receiving level information transmitted from the mobile station, the receiving level information which the mobile station generates by measuring receiving levels of radio waves transmitted from surrounding base stations; and
a receiver which receives a plurality of communication results transmitted to the proxy radio base station via a radio transmission interface, the communication results communicated by the requested proxy radio base station with the plurality of radio base stations on behalf of the relay station via wired transmission interfaces;
wherein when the proxy request section recognizes that the number of times radio signaling at the mobile station is smaller than the predetermined value based on the receiving level information, the relay station communicates with the plurality of radio base stations directly.

7. The relay station according to claim 6, wherein:
when a mobile station under control of the relay station performs hand-over, the proxy request section requests the proxy radio base station to select a hand-over destination base station from among the plurality of radio base stations, and acquires the hand-over destination base station selected by the proxy radio base station from the proxy radio base station.

8. The relay station according to claim 7, wherein when the proxy request section requests the proxy radio base station to select the hand-over destination base station, the communication control section informs the proxy radio base station in advance about state information for the mobile station.

9. The relay station according to claim 6, wherein when the relay station reports relay-station-side interference amount information which is an interference amount measured by the communication control section to the plurality of radio base stations or receives base-station-side interference amount information which is an interference amount measured by the plurality of radio base stations, the proxy request section requests the proxy radio base station to report the relay-station-side interference amount information to the plurality of radio base stations or collect the base-station-side interference amount information from the plurality of radio base stations, and acquires the base-station-side interference amount information collected by the plurality of radio base stations from the proxy radio base station.

10. The relay station according to claim 6, wherein at the time of surrounding radio base stations transmitting data in cooperation to a mobile station and scheduling being performed for transmitting the data:
the communication control section performs the scheduling and generates scheduling information; and the proxy request section requests the proxy radio base station to inform the plurality of radio base stations about the scheduling information.

11. A radio base station which is connected by radio to a relay station and via which communication is performed between the relay station and a plurality of surrounding radio base stations connected to the radio base station by wires, the radio base station comprising:
a communication control section which exercises communication control; and
a proxy control section which communicates with the plurality of surrounding radio base stations on behalf of the relay station via wired transmission interfaces at the time of the relay station requesting the radio base station to communicate with the plurality of surrounding radio base stations on behalf of the relay station and which transmits a plurality of communication results from the plurality of surrounding radio base stations to the relay station via a radio transmission interface;
wherein the relay station requests the proxy communication from the proxy control section in the case of recognizing that the number of times radio signaling at a mobile station communicating with the relay station is larger than a predetermined value based on receiving level information transmitted from the mobile station, the receiving level information which the mobile station generates by measuring receiving levels of radio waves transmitted from surrounding base stations;
and wherein the relay station stops requesting the proxy communication from the proxy control section in the case of recognizing that the number of times radio signaling at the mobile station is smaller than the predetermined value based on the receiving level information.

12. The radio base station according to claim 11, wherein when a mobile station under control of the relay station performs hand-over, the proxy control section which is requested by the relay station to select a hand-over destination base station selects the hand-over destination base station and informs the relay station about a selection result.

13. The radio base station according to claim 11, wherein:
when notice of relay-station-side interference amount information which is an interference amount measured by the relay station is given to the plurality of surrounding radio base stations, the proxy control section informs the plurality of surrounding radio base stations about the relay-station-side interference amount information at a request of the relay station; and
when base-station-side interference amount information which is an interference amount measured by each of the plurality of surrounding radio base stations is transmitted to the relay station, the proxy control section collects the base-station-side interference amount information and informs the relay station about collection results, at a request of the relay station.

14. The radio base station according to claim 11, wherein when the plurality of surrounding radio base stations transmit data in cooperation to a mobile station, the relay station performs scheduling for transmitting the data, and the proxy control section receives a request from the relay station to inform the plurality of surrounding radio base stations about scheduling information for the relay station, the proxy control section transmits the scheduling information to the plurality of surrounding radio base stations.

15. A radio communication method comprising:
using a proxy radio base station, a plurality of radio base stations connected to the proxy radio base station by wires, and a relay station which is connected by radio to the proxy radio base station and which communicates with the plurality of radio base stations via the proxy radio base station;

requesting, by the relay station, the proxy radio base station to communicate with the plurality of radio base stations on behalf of the relay station when recognizing that the number of times radio signaling at a mobile station communicating with the relay station is larger than a predetermined value based on receiving level information transmitted from the mobile station, the receiving level information which the mobile station generates by measuring receiving levels of radio waves transmitted from surrounding base stations;

communicating, by the requested proxy radio base station, with the plurality of radio base stations on behalf of the relay station via wired transmission interfaces and transmitting, by the requested proxy radio base station, a plurality of communication results from the plurality of radio base stations to the relay station via a radio transmission interface; and communicating, by the relay station, with the plurality of radio base stations directly when recognizing that the number of times radio signaling at the mobile station is smaller than the predetermined value based on the receiving level information.

\* \* \* \* \*